Jan. 28, 1958     C. J. VAN EYK     2,821,591
GOVERNOR FOR ELECTRIC MOTORS
Filed Oct. 3, 1955
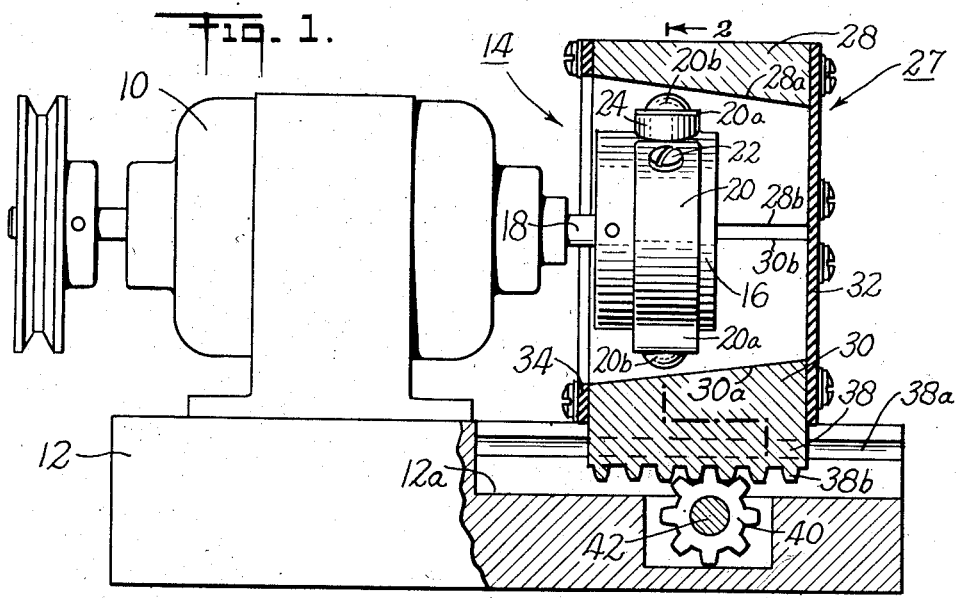
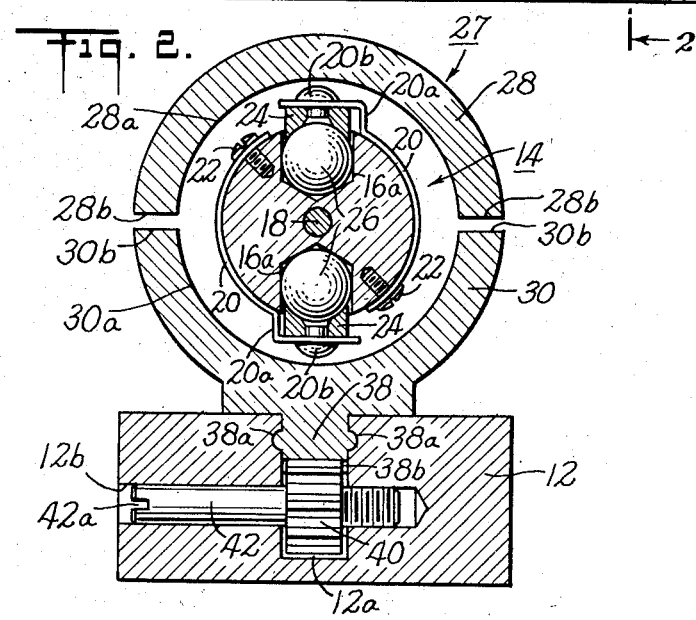
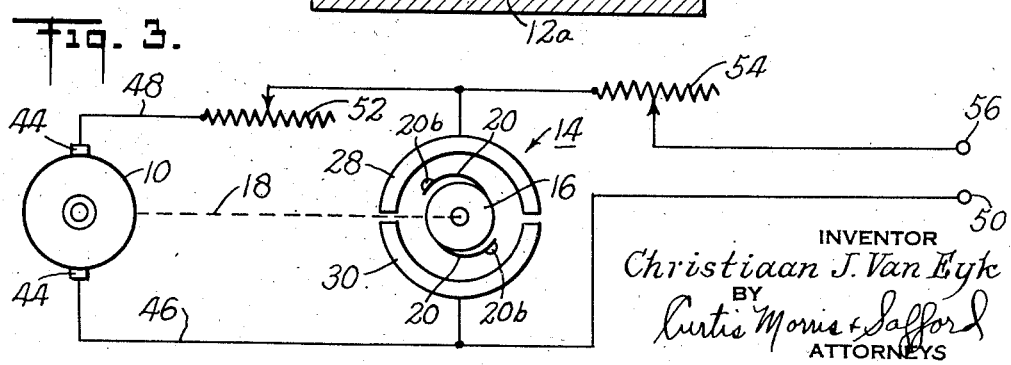
INVENTOR
Christiaan J. Van Eyk
BY
Curtis Morris & Safford
ATTORNEYS

United States Patent Office 2,821,591
Patented Jan. 28, 1958

2,821,591

GOVERNOR FOR ELECTRIC MOTORS

Christiaan J. Van Eyk, Byram, Conn., assignor to Seaboard Electric Company, New York, N. Y.

Application October 3, 1955, Serial No. 538,014

2 Claims. (Cl. 200—80)

This invention relates to a governor for electric motors.

Most of the electric motor governors in use prior to the present invention may be classified into a very limited number of types. One of these types employs a centrifugally operated switch which opens above a predetermined speed, breaking the circuit to the motor armature and allowing the motor to "coast" until its speed decays to a level which allows the switch to close again. In another type, motor speed is reduced by inserting resistance in series with the motor armature or increased by inserting resistance in series with the field winding (in the case of shunt-wound motors) or by shunting the field winding (in the case of series-wound motors).

All of these previous types of governors have the common disadvantage that their effect is relatively gradual, with the result that the motor speed oscillates above and below the desired level at a low frequency in an action known as "hunting." While the previous types of governors have functioned acceptably at realtively high shaft speeds, for example above 4,000 R. P. M., they have been partially ineffective at lower speeds.

Among the objects of the present invention is accordingly that of providing an electric motor governor which is more positive in its action than previous devices and wherein the tendency to low frequency "hunting" is substantially eliminated. Another object is the provision of such a governor which is effective even at very low motor speeds, which is adjustable to regulate the motor speed at any desired motor level within a wide range, and which may be adjusted while the motor is running. A further object is that of providing such a governor which is reliable in operation and inexpensive in construction.

In the drawings:

Figure 1 is a side elevational view, partly in section, of an electric motor with an associated governor embodying features of the present invention.

Figure 2 is a transverse sectional view through the governor, taken generally along the line 2—2 of Figure 1.

Figure 3 is a schematic diagram of the electrical circuit of the motor and governor.

In the particular embodiment of the invention which is shown and described herein, the invention is illustratively shown as applied to control the speed of a small direct-current motor of the type having a permanent magnet field. As will readily be understood, however, the principles of the invention are equally applicable to other types of electric motors for operation on either alternating or direct current.

As may be seen in Figures 1 and 2, the electric motor 10 is supported on a base 12 which also supports the governor which is generally indicated 14. The governor 14 includes a rotor 16 which is fixed on one end of the motor shaft 18. Secured to the periphery of the rotor 16 at diametrically opposed points are a pair of spring members 20, which are attached at one end to the rotor 16 by screws 22 and which are curved throughout most of their length so that they normally lie flush against the periphery of the rotor 16. The free ends of the spring members 20 are formed to provide radially offset portions 20a with outwardly projecting bosses 20b therein. The offset portions 20a of the spring members 20 carry at their inner faces cup members 24 having concave inner surfaces adapted to bear against metal balls 26 which are received in recesses 16a in the rotor 16.

As the rotor 16 is rotated by the motor 10, the balls 26 tend to move outwardly by centrifugal force, pushing the ends of the spring members 20 outwardly against their spring resistance through a radial distance which varies in direct relation with (though not necessarily at fixed ratio to) the angular velocity of the rotor 16.

Surrounding the rotor assembly is a contact assembly generally indicated 27, including a pair of generally semi-cylindrical metallic contact members 28 and 30 having inner surfaces 28a and 30a in the shape of equal segments of a cone coaxial with the rotor 16. The two contact members 28 and 30 are held in assembled relation, with their lateral edges 28b and 30b slightly spaced apart, by a plate 32 (Figure 1) of insulating material which is secured to the outer faces of the contact members 28 and 30, and by a ring 34 of insulating material which is secured to the inner faces of the contact members.

The lower contact member 30 is provided with a generally flat bottom 36 which is slidably supported on the upper surface of the base 12 of the governor, and which has, at its lateral center, a longitudinally extending projection 38 which is slidably received in a slot 12a in the base 12 and keyed therein by ridges 38a at either side. The lower surface of the projection 38 is toothed to form a rack 38b which meshes with a pinion 40 in the slot 12a, the pinion being fixed on a transverse shaft 42 which is rotatably received in a bore 12b in the base 12. The exposed end of the shaft 42 is notched as indicated at 42a to provide means for engaging the shaft 42 with a screw driver to rotate the shaft 42 and the pinion 40 to move the outer contact assembly 27 longitudinally of the base 12.

As the spring members 20 fly outwardly under the centrifugal force of their own mass and that of the balls 26, the bosses 20b at the ends of the spring members 20 come into conductive engagement with the inner surfaces 28a and 30a of the outer contacts 28 and 30. Because the bosses 20b of the two spring members 20 are diametrically opposed to each other, one of them is always in contact with one of the outer contacts 28 when the other is in engagement with the other outer contact member 30. Because the spring members 20 and the rotor 16 are formed of metallic material, engagement of the bosses 20b with the outer contacts 28 and 30 effectively completes an electrical circuit between the two outer contacts.

In Figure 3 is shown the electrical circuit of the governor. As may be sen in this figure, the armature of the electric motor 10 is connected through commutator brushes 44 to a pair of conductors 46 and 48. One of these conductors 46 extends to one terminal 50 of a source of direct current electrical power. The other conductor 48 is connected in series through a pair of rheostats 52 and 54 to the other terminal 56 of the D. C. power source. One of the outer contacts 28 of the governor 14 is connected to the junction of the two rheostats 52 and 54, while the other outer contact 30 is connected to the aforementioned conductor 46.

When the motor 10 and the rotor 16 are stationary, as shown in Figure 3, the spring members 20 are held in their inner position by their inherent resilience. Thus, there is no electrical circuit between the outer contacts 28 and 30 of the governor 14. When D. C. power is applied to the terminals 50 and 56, current flows through the armature of the motor 10 in series with the rheostats 52 and 54, causing rotation of the motor 10. As the motor 10 rotates, the spring members 20 on the rotor 16 are forced outwardly against their spring resistance by the centrifugal force of their own mass and that of the balls 26 (Figure 2). At a predetermined rotational speed of the motor 10 and rotor 16, the bosses 20b of the spring members 20 will come into respective engagement with the two outer contacts 28 and 30 of the governor. completing a circuit between them. This short-circuits the D. C. power source through the rheostat 54 so that no current from the D. C. source will flow through the armature of the motor 10. Thus, the driving power of the motor is removed.

Moreover, the completion of the electrical circuit through the contacts 28 and 30 also short-circuits the armature of the motor 10 through the rheostat 52. When this occurs, the motor 10 acts as a generator with current being induced in the armature as the windings of the armature cut the lines of force of the permanent magnetic field. This current flowing in the armature is in a direction opposite to that of the normal current flow from the D. C. power source. This reverse current in the armature creates a force which tends to drive the motor in the reverse direction—in other words, the motor is acting as a self-energizing magnetic brake.

The governor also has a mechanical braking effect because the contacts are so arranged that excessive motor speed causes the two rotating contacts 20b to come into frictional engagement with the two fixed arcuate outer contacts 28 and 30.

It will thus be understood that when the governor contacts are engaged there is a very strong tendency toward reduction in speed of the motor, not only due to the mechanical braking effect produced by friction of the contacts but also to removal of the driving power from the motor, and to the magnetic braking effect described. The speed of the motor 10 and rotor 16 thus rapidly declines below the level necessary to keep the spring members 20 in conductive engagement with the outer contacts 28 and 30 so that the circuit between these contacts 28 and 30 is quickly broken. This results in reapplying power to the motor so that the motor again accelerates and rapidly reaches the level necessary to reclose the governor contacts. The driving power and the braking force are thus alternately applied in rapid succession to the motor, to achieve an average motor speed at the desired level.

The rheostat 54 protects the D. C. power source when the governor contacts are engaged; it is adjusted to limit the peak current load on the source to a safe value. The rheostat 52 limits the current flowing through the armature during the time the governor contacts are closed and regulates the magnetic braking action previously described; it is adjusted to achieve optimum regulatory action.

Since the inner surfaces of the outer governor contacts 28 and 30 are conical in shape, longitudinal movement of the outer contact assembly 27 in the manner previously described, varies the spacing between the spring members 20 and the outer contacts 28 and 30, thereby varying the radial distance through which the spring members 20 must move outwardly before they come into conductive engagement with the outer contacts 28 and 30. Since the radial position of the spring members 20 varies with the motor speed, the longitudinal position of the outer contact assembly determines the speed at which the motor is regulated. This setting may, of course, be changed while the motor is running.

From the foregoing description, it will be understood that the present invention accomplishes the aforementioned as well as other apparent desirable objectives. However, it should be understood that the particular embodiment of the invention which is shown and described herein is intended as merely illustrative rather than as restrictive and that various alternatives may be employed without departing from the scope of the invention which is defined by the appended claims.

I claim:

1. A governor for an electric motor comprising a rotor, a first contact carried by said rotor, spring means urging said first contact inwardly but being yieldable to permit said first contact to be moved outwardly by centrifugal force to a radial distance from the axis of said rotor varying with the angular speed of said rotor, a second contact mounted around said rotor and having a conical inner surface coaxial with said rotor, said second contact being mounted for movement along the axis of said rotor whereby to vary the radial spacing between said first contact and the opposing portion of said second contact and thereby vary the angular speed of said rotor at which said contacts are closed.

2. A governor for an electric motor comprising a rotor, a first pair of contacts of symmetrical configuration carried by said rotor at diametrically opposite positions and conductively interconnected, spring means urging said first pair of contacts inwardly but being yieldable to permit said first pair of contacts to be moved outwardly by centrifugal force to a radial distance from the axis of said rotor varying with the angular speed of said rotor, a second pair of contacts having inner surfaces comprising diametrically opposed segments of a cone coaxial with said rotor, said second pair of contacts being mounted for movement along the axis of said rotor to vary the radial spacing between said first pair of contacts and the respective opposing portions of said second pair of contacts and thereby vary the angular speed of said rotor at which said first pair of contacts comes into respective engagement with said second pair of contacts.

References Cited in the file of this patent

UNITED STATES PATENTS 1,057,436    Leeds _____ Apr. 1, 1913